(12) United States Patent
Bradbury et al.

(10) Patent No.: US 11,308,229 B2
(45) Date of Patent: Apr. 19, 2022

(54) PROGRAM INTERRUPTIONS FOR PAGE IMPORTING/EXPORTING

(71) Applicant: International Business Machines Corporation, Armonk, NY (US)

(72) Inventors: Jonathan D. Bradbury, Poughkeepsie, NY (US); Martin Schwidefsky, Boeblingen (DE); Christian Borntraeger, Stuttgart (DE); Lisa Cranton Heller, Rhinebeck, NY (US); Heiko Carstens, Boeblingen (DE); Fadi Y. Busaba, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 353 days.

(21) Appl. No.: 16/296,352

(22) Filed: Mar. 8, 2019

(65) Prior Publication Data

US 2020/0285762 A1 Sep. 10, 2020

(51) Int. Cl.
*G06F 21/62* (2013.01)
*G06F 21/60* (2013.01)
(Continued)

(52) U.S. Cl.
CPC .......... *G06F 21/6209* (2013.01); *G06F 21/00* (2013.01); *G06F 21/60* (2013.01);
(Continued)

(58) Field of Classification Search
CPC ...... G06F 21/6209; G06F 21/00; G06F 21/60; G06F 21/602; G06F 9/45558;
(Continued)

(56) References Cited

U.S. PATENT DOCUMENTS 5,343,527 A 8/1994 Moore
5,757,919 A 5/1998 Herbert et al.
(Continued)

FOREIGN PATENT DOCUMENTS

CN 105512559 A 4/2016
CN 107667350 A 2/2018
(Continued)

OTHER PUBLICATIONS

Machine translation of Maeng et al. Korean Publication No. KR 2013-0000253 A, published on Jan. 2, 2013 (Year: 2013).*
(Continued)

*Primary Examiner* — Theodore C Parsons
*Assistant Examiner* — Howard H. Louie
(74) *Attorney, Agent, or Firm* — Cantor Colburn LLP; Edward Wixted

(57) ABSTRACT

An example computer-implemented method includes presenting, by a hardware control of a computing system, an exception to an untrusted entity when the untrusted entity accesses a secure page stored in a memory of the computing system, the exception preventing the untrusted entity from accessing the secure page. The method further includes, in response to the exception, issuing, by the untrusted entity, an export call routine. The method further includes executing, by a secure interface control of the computing system, the export call routine.

25 Claims, 15 Drawing Sheets

(51) Int. Cl.
  *G06F 21/00* (2013.01)
  *G06F 9/455* (2018.01)
(52) U.S. Cl.
  CPC ........ *G06F 21/602* (2013.01); *G06F 9/45558* (2013.01); *G06F 2009/45587* (2013.01); *G06F 2212/65* (2013.01); *G06F 2221/2147* (2013.01)
(58) Field of Classification Search
  CPC ....... G06F 2009/45587; G06F 2212/65; G06F 2221/2147; G06F 21/62; G06F 9/455
  See application file for complete search history.

(56) References Cited

U.S. PATENT DOCUMENTS

| | | |
|---|---|---|
| 6,021,201 A | 2/2000 | Bakhle et al. |
| 7,159,110 B2 | 1/2007 | Douceur et al. |
| 7,653,819 B2 | 1/2010 | Bade et al. |
| 7,984,108 B2 | 7/2011 | Landis et al. |
| 8,108,641 B2 | 1/2012 | Goss et al. |
| 8,910,238 B2 | 12/2014 | Lukacs et al. |
| 9,251,090 B1 | 2/2016 | Borthakur et al. |
| 9,391,772 B2 | 7/2016 | Suzuki |
| 9,483,639 B2 | 11/2016 | Sliwa et al. |
| 9,607,151 B2 | 3/2017 | Mooring et al. |
| 9,612,058 B2 | 4/2017 | Singh et al. |
| 9,720,723 B2 | 8/2017 | Bacher et al. |
| 9,841,987 B2 | 12/2017 | Bacher et al. |
| 10,095,538 B2 | 10/2018 | Mooring et al. |
| 10,157,146 B2 | 12/2018 | Tsirkin et al. |
| 10,169,577 B1 | 1/2019 | Sobel et al. |
| 10,754,794 B2 | 8/2020 | Banginwar et al. |
| 2004/0003324 A1* | 1/2004 | Uhlig .................. G06F 11/0712 714/38.13 |
| 2007/0277160 A1* | 11/2007 | Camiel .................. G06F 12/145 717/136 |
| 2007/0294494 A1 | 12/2007 | Conti et al. |
| 2008/0077767 A1 | 3/2008 | Khosravi et al. |
| 2009/0113110 A1* | 4/2009 | Chen ................... G06F 9/45533 711/6 |
| 2009/0222816 A1 | 9/2009 | Mansell et al. |
| 2012/0185699 A1 | 7/2012 | Arnold |
| 2013/0136125 A1 | 5/2013 | Jain et al. |
| 2014/0237609 A1 | 8/2014 | Sharp et al. |
| 2016/0048464 A1 | 2/2016 | Nakajima et al. |
| 2016/0048680 A1 | 2/2016 | Lutas et al. |
| 2016/0064096 A1* | 3/2016 | Micheloni .......... G11C 16/3427 365/185.12 |
| 2016/0216982 A1 | 7/2016 | Variath et al. |
| 2017/0054557 A1 | 2/2017 | Rozas et al. |
| 2017/0277898 A1 | 9/2017 | Powell et al. |
| 2018/0019979 A1 | 1/2018 | Bacher et al. |
| 2018/0107608 A1 | 4/2018 | Kaplan et al. |
| 2018/0247082 A1 | 8/2018 | Durham et al. |
| 2018/0248847 A1 | 8/2018 | Guri et al. |
| 2018/0285140 A1 | 10/2018 | Kaplan et al. |
| 2018/0341529 A1 | 11/2018 | Kou et al. |
| 2019/0068557 A1* | 2/2019 | Noel .......... H04L 9/14 |
| 2019/0068561 A1 | 2/2019 | Caragea |

FOREIGN PATENT DOCUMENTS

| | | | |
|---|---|---|---|
| EP | 2630608 B1 | 1/2016 | |
| KR | 2013-0000253 A * | 1/2013 | ............. G06F 21/20 |
| TW | I556107 B | 11/2016 | |
| TW | 201729136 A | 8/2017 | |
| WO | 2014081611 A2 | 5/2014 | |
| WO | 2015178987 A2 | 11/2015 | |
| WO | 2017211651 A1 | 12/2017 | |

OTHER PUBLICATIONS

Elwell et al.; "Hardening Extended Memory Access Control Schemes with Self-Verified Address Spaces"; IEEE 2017; pp. 392-399.
International Search Report and Written Opinion Issued in International Application No. PCT/EP2020/055966 dated May 26, 2020; 9 Pages.
International Search Report and Written Opinion Issued in International Application No. PCT/IB2020/051943 dated Jul. 1, 2020; 8 Pages.
Jin et al.; "Architectural Support for Secure Virtualization under a Vulnerable Hypervisor"; MICRO' 11; Dec. 3-7, 2011; pp. 272-283.
Taiwan Office Action Issued in Taiwan Application No. 109104344 dated Mar. 25, 2021; 7 Pages.
"Cooperative Active Memory Sharing Across OS's in a Virtualized Environment"; IP.com No. IPCOM000219099D; IP.com Publication Date: Jun. 19, 2012; 3 Pages.
"Enhanced Memory Usage Based on Optimized Virtual Machine Placement"; IP.com No. IPCOM000197321D; IP.com Publication Date: Jul. 2, 2010; 4 Pages.
"Hypervisor Based Method for Ensuring Consistent and Reliable Access to Shared Resource Between Logical Partitions"; IP.com No. IPCOM000176913D; IP.com Publication Date: Nov. 29, 2008; 6 Pages.
Bradbury et al., "Secure Paging With Page Change Detection", U.S. Appl. No. 16/296,303; filed Mar. 8, 2019.
Jakub Szefer et al., "Architectural Support for Hypervisor-Secure Virtualization", Proceedings of the Seventeenth International Conference on Architectural Support for Programming Languages and Operating Systems (ASPLOS'12), Mar. 3-7, 2012 pp. 437-449.
List of IBM Patents or Patent Applictions Treated as Related; (Appendix P), Date Filed Jun. 5, 2019, 2 pages.
Maheshwari et al., "How to build a trusted database system on untrusted storage." Proceedings of the 4th conference on Symposium on Operating System Design & Implementation—vol. 4. USENIX Association, 2000, 16 pages.
Mijat et al.; "Virtualization is Coming to a Platform Near You—The ARM Architecture Virtualization Extensions and the Importance of System MMU for Virtualized Solutions and Beyond"; White Paper—ARM; 2010-2011; 12 Pages.
Rahimi et al.; "Security Implications of Different Virtualization Approaches for Secure Cyber Architectures"; Secure & Resilient Cyber Architectures Conference MITRE; Oct. 29, 2010; 6 Pages.
Schwidefsky et al., "Secure Interface Control High-Level Page Management", U.S. Appl. No. 16/296,457, filed Mar. 8, 2019.
Yueqiang Cheng et al., "Efficient Virtualization-Based Application Protection Against Untrusted Operating System", Proceedings of the 10th ACM Symposium on Information, Asia CCS' 15, Apr. 14-17, 2015, ACM, pp. 345-356.
Yushi Omote et al., "Hypervisor-based Background Encryption", Proceedings of the 27th Annual ACM Symposium on Applied Computing (SAC '12), Mar. 25-29, 2012, ACM, pp. 1829-1836.
Mell et al., "The NIST Definition of Cloud Computing," National Institute of Standards and Technology, Information Technology Laboratory, Special Publication 800-145, Sep. 2011 (7 pages).
International Search Report and Written Opinion Issued in International Application No. PCT/IB2020/051941 dated Jun. 30, 2020; 9 Pages.
Suh et al.; "Efficient Memory Integrity Verification and Encryption for Secure Processors"; Proceedings 36th Annual IEEE/ACM International Symposium on Microarchitecture; MICRO-36; Dec. 5, 2003; 12 Pages.

* cited by examiner

PROGRAM INTERRUPTIONS FOR PAGE IMPORTING/EXPORTING

BACKGROUND

The present invention relates generally to computer technology, and more specifically, to program interruptions for page importing/exporting.

Cloud computing and cloud storage provides users with capabilities to store and process their data in third-party data centers. Cloud computing facilitates the ability to provision a virtual machine (VM) for a customer quickly and easily, without requiring the customer to purchase hardware or to provide floor space for a physical server. The customer may easily expand or contract the VM according to changing preferences or requirements of the customer. Typically, a cloud computing provider provisions the VM, which is physically resident on a server at the provider's data center. Customers are often concerned about the security of data in the VM, particularly since computing providers often store more than one customer's data on the same server. Customers may desire security between their own code/data and the cloud computing provider's code/data, as well as between their own code/data and that of other VMs running at the provider's site. In addition, the customer may desire security from the provider's administrators as well as against potential security breaches from other code running on the machine.

To handle such sensitive situations, cloud service providers may implement security controls to ensure proper data isolation and logical storage segregation. The extensive use of virtualization in implementing cloud infrastructure results in unique security concerns for customers of cloud services as virtualization alters the relationship between an operating system (OS) and the underlying hardware, be it computing, storage, or even networking hardware. This introduces virtualization as an additional layer that itself must be properly configured, managed and secured.

In general, a VM, running as a guest under the control of a host hypervisor, relies on that hypervisor to transparently provide virtualization services for that guest. These services include memory management, instruction emulation, and interruption processing.

In the case of memory management, the VM can move (page-in) its data from a disk to be resident in memory and the VM can also move its data back out (page-out) to the disk. While the page is resident in memory, the VM (guest) uses dynamic address translation (DAT) to map the pages in memory from a guest virtual address to a guest absolute address. In addition, the host hypervisor has its own DAT mapping (from host virtual address to host absolute address) for the guest pages in memory and it can, independently and transparently to the guest, page the guest pages in and out of memory. It is through the host DAT tables that the hypervisor provides memory isolation or sharing of guest memory between two separate guest VMs. The host is also able to access the guest memory to simulate guest operations, when necessary, on behalf of the guest.

SUMMARY

According to one or more examples described herein, a computer-implemented method includes includes presenting, by a hardware control of a computing system, an exception to a untrusted entity when the untrusted entity accesses a secure page stored in a memory of the computing system, the exception preventing the untrusted entity from accessing the secure page. The method further includes, in response to the exception, issuing, by the untrusted entity, an export call routine. The method further includes executing, by a secure interface control of the computing system, the export call routine.

According to one or more examples described herein, the export call routine includes encrypting, by the secure interface control, the secure page. According to one or more examples described herein, the export call routine includes prior to the encrypting, locking, by the secure interface control, the secure page; and subsequent to the encrypting, unlocking, by the secure interface control, the secure page. According to one or more examples described herein, the export call routine includes prior to the encrypting, registering, by the secure interface control, the secure page to the secure interface control in a zone-security table. According to one or more examples described herein, the export call routine includes capturing, by the secure interface control, a hash of encrypted contents of the secure page. According to one or more examples described herein, the export call routine includes, subsequent to the encrypting, marking, by the secure interface control, a host absolute page as non-secure. According to one or more examples described herein, the export call routine includes, subsequent to the encrypting, registering, by the secure interface control, the host absolute page as non-secure in a zone-security table. According to one or more examples described herein, the export call routine includes, prior to locking the secure page, determining whether the secure page is locked; responsive to determining that the secure page is locked, generating a busy indicator to the untrusted entity; and waiting a delay period. According to one or more examples described herein, the secure interface control comprises firmware, hardware, or a combination of firmware and hardware; and the untrusted entity comprises a hypervisor.

According to one or more examples described herein, a computer-implemented method includes responsive to a secure entity accessing a page that has been paged-in by a untrusted entity of a computing system but is not yet secure, presenting, by a hardware control of the computing system, an exception to the untrusted entity of the computing system, the exception preventing the untrusted entity from accessing the page. The method further includes, responsive to the exception, issuing, by the untrusted entity, an import call routine. The method further includes executing, by a secure interface control of the computing system, the import call routine.

According to one or more examples described herein, the import call routine includes determining, by a secure interface control of the computing system, whether the secure page is a shared page. According to one or more examples described herein, the import call routine includes, responsive to determining that the secure page is not a shared secure page, marking, by the secure interface control, the secure page as secure. According to one or more examples described herein, the import call routine includes registering, by the secure interface control, the secure page to the secure interface control in a zone-security table. In accordance with additional or alternative embodiments of the present invention, the import call routine includes decrypting, by the secure interface control, the secure page.

Other examples described herein Advantages of the disclosed techniques include implement the features of the above-described methods in computer systems and in computer program products.

Advantages of the disclosed techniques include preventing malicious behavior from an untrusted entity. For example, the present techniques use host program interruption to prevent a malicious untrusted entity from accessing secure storage while allowing an entity not acting maliciously to be notified that a call to the secure interface control is needed. This provides a technological improvement over existing systems that share pages in memory between a hypervisor and a guest. This improves security in a hypervisor environment by preventing a malicious untrusted entity from accessing secure guest storage.

Additional features and advantages are realized through the techniques of the present disclosure. Other embodiments and aspects of the invention are described in detail herein and are considered a part of the invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
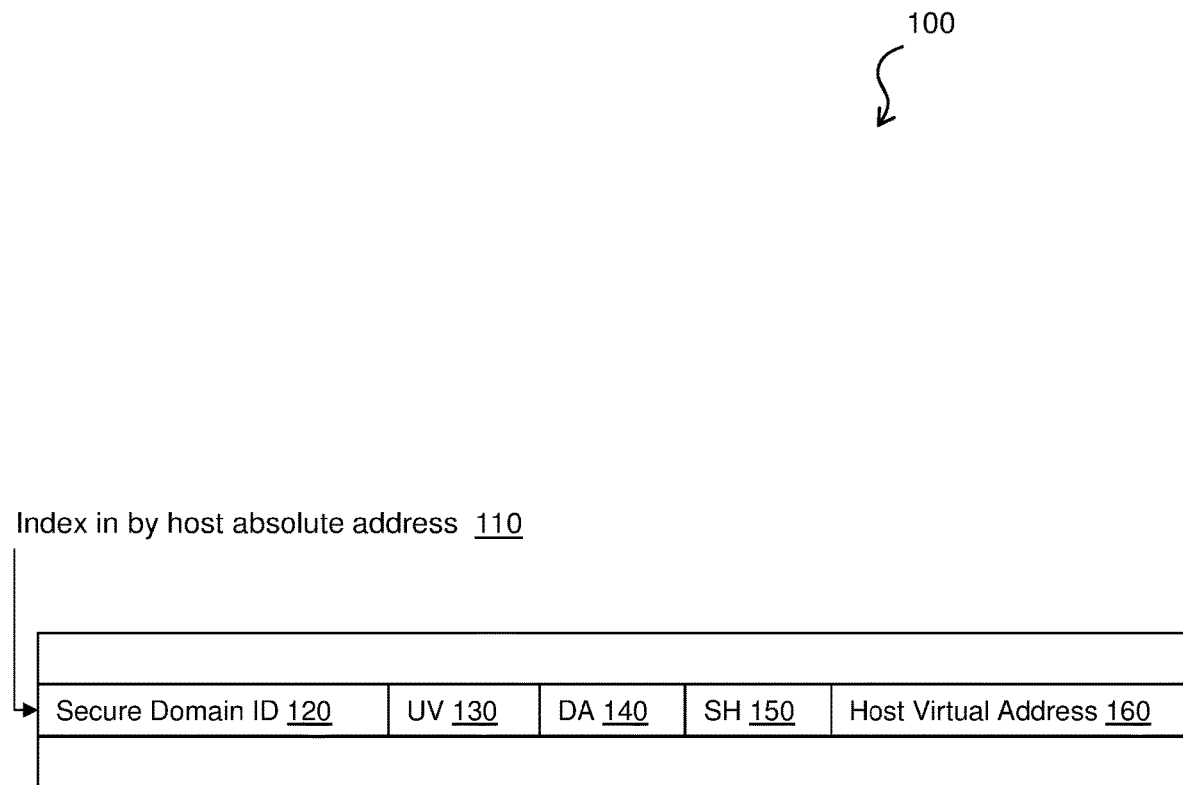
FIG. 1 depicts a table for zone security according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

The techniques described herein provide for the use of host program interruptions in a secure guest environment to inform a hypervisor that machine intervention for paging is needed and to prevent malicious hypervisor behavior. The present techniques use host program interruption to prevent a malicious hypervisor from accessing secure guest storage while allowing a "well-behaved" hypervisor (i.e., a hypervisor not acting maliciously) to be notified that a call to the a secure interface control (also referred to as "UV") is needed.

One or more embodiments of the present invention provide a convert from secure storage (export) UV call (UVC) instruction to transition the page from being accessible in the clear (unencrypted) by a single, secure guest configuration to being encrypted and accessible by the hypervisor for paging-out. A convert to secure storage (import) UVC instruction is also provided to decrypt and assign the storage to a secure-guest configuration after paging-in.

One or more embodiments of the present invention leverage an efficient, lightweight secure interface control between the software and the machine to provide additional security.

A virtual machine (VM), running as a guest under the control of a host hypervisor, relies on that hypervisor to transparently provide virtualization services for that guest. These services can apply to any interface between a secure entity and another untrusted entity that traditionally allows access to the secure resources by this other entity. As mentioned previously, these services can include, but are not limited to memory management, instruction emulation, and interruption processing. For example, for interrupt and exception injection, the hypervisor typically reads and/or writes into a prefix area (low core) of the guest. The term "virtual machine" or "VM" as used herein refers to a logical representation of a physical machine (computing device, processor, etc.) and its processing environment (operating system (OS), software resources, etc.). The VM is maintained as software that executes on an underlying host machine (physical processor or set of processors). From the perspective of a user or software resource, the VM appears to be its own independent physical machine. The terms "hypervisor" and "VM Monitor (VMM)" as used herein refer to a processing environment or platform service that manages and permits multiple VM's to execute using multiple (and sometimes different) OS's on a same host machine. It should be appreciated that deploying a VM includes an installation process of the VM and an activation (or starting) process of the VM. In another example, deploying a VM includes an activation (or starting) process of the VM (e.g., in case the VM is previously installed or already exists).

In order to facilitate and support secure guests, a technical challenge exists where additional security is required between the hypervisor and the secure guests without relying on the hypervisor, such that the hypervisor cannot access data from the VM, and hence, cannot provide services in the way described above.

The secure execution described herein provides a hardware mechanism to guarantee isolation between secure storage and non-secure storage as well as between secure storage belonging to different secure users. For secure guests, additional security is provided between the "untrusted" non-secure hypervisor and the secure guests. In order to do this, many of the functions that the hypervisor typically does on behalf of the guests need to be incorporated into the machine. A new secure interface control, also referred to herein as an "UV", is described herein to provide a secure interface between the hypervisor and the secure guests. The terms secure interface control and UV are used interchangeably herein. The secure interface control works in collaboration with the hardware to provide this additional security. In addition, a lower level hypervisor may be providing virtualization for this untrusted hypervisor and, if this lower level hypervisor is implemented in trusted code, it can also be part of the secure interface control.

This mechanism may also apply when various services are provided by a separate, authorized program that also has access to the service caller's data and state. In one case, this separate program may be a supervisor program providing supervisor functions through the use of a supervisor call interface in another case.

The secure interface control, in one example, is implemented in internal, secure, and trusted hardware and/or firmware. For a secure guest or entity, the secure interface control provides the initialization and maintenance of the secure environment as well as the coordination of the dispatch of these secure entities on the hardware. While the secure guest is actively using data and it is resident in host storage, it is kept "in the clear" in secure storage. Secure guest storage can be accessed by that single secure guest—this being strictly enforced by the hardware. That is, the hardware prevents any non-secure entity (including the hypervisor or other non-secure guests) or different secure guest from accessing that data. In this example, the secure interface control runs as a trusted part of the lowest levels of firmware. The lowest level, or millicode, is really an extension of the hardware and is used to implement the complex instructions and functions defined for example in zArchitecture® from IBM. Millicode has access to all parts of storage, which in the context of secure execution, includes its own secure UV storage, non-secure hypervisor storage, secure guest storage, and shared storage. This allows it to provide any function needed by the secure guest or by the hypervisor in support of that guest. The secure interface control also has direct access to the hardware which allows the hardware to efficiently provide security checks under the control of conditions established by the secure interface control.

In accordance with one or more embodiments of the present invention, a secure-storage bit is provided in the hardware to mark a secure page. When this bit is set, the hardware prevents any non-secure guest or hypervisor from accessing this page. In addition, each secure or shared page is registered in a zone-security table and is tagged with a secure-guest-domain identification (ID). When the page is non-secure it is marked as such in the zone-security table. This zone-security table is maintained by the secure interface control per partition or zone. There is one entry per host absolute page which is used by the hardware on any DAT translation made by a secure entity to verify that the page is only accessed by the secure guest or entity that owns it.

In accordance with one or more embodiments of the present invention, the software uses UVC instruction to request the secure interface control to perform a specific action. For example, the UVC instruction can be used by the hypervisor to initialize the secure interface control, create the secure guest domain (e.g., secure guest configuration), and create the virtual CPUs within that secure configuration. It can also be used to import (decrypt and assign to secure guest domain) and export (encrypt and allow host access to) a secure guest page as part of the hypervisor page-in or page-out operations. In addition, the secure guest has the ability to define storage shared with the hypervisor, make secure-storage shared, and make shared-storage secure.

To provide security, when the hypervisor is transparently paging the secure guest data in and out, the secure interface control, working with the hardware, provides and guarantees the decryption and encryption of the data. In order to accomplish this, the hypervisor is required to issue new UVCs when paging the guest secure data in and out. The hardware, based on controls setup by the secure interface control during these new UVCs, will guarantee that these UVCs are indeed issued by the hypervisor.

In this new secure environment, whenever the hypervisor is paging-out a secure page, it is required to issue a new convert from secure storage (export) UVC. The secure interface control, in response to this export UVC, will 1) indicate that the page is "locked" by the UV, 2) encrypt the page, 3) set the page to non-secure, and, 4) reset the UV lock. Once the export UVC is complete, the hypervisor can now page-out the encrypted guest page.

In addition, whenever the hypervisor is paging-in a secure page, it issues a new convert to secure storage (import) UVC. When the secure guest attempts to access a page which has been paged-out by a well-behaved hypervisor, and, therefore is not resident in host memory and is invalid in the host translation (e.g., page) table, a page-translation exception (PIC11) is presented to the host. The hypervisor then pages the guest page into a non-secure host absolute page, establishes the host mapping for that guest absolute page, and re-dispatches the secure guest. At this point the page remains encrypted and is still marked as non-secure. When that guest attempts to re-access that page, the hardware presents a non-secure-storage access (PIC3E) exception. This exception is taken to prevent a secure guest from accessing its page when the page has not been decrypted and to indicate to a well-behaved hypervisor that an import UVC is required. The UV, or secure interface control, in response to this import UVC, will 1) mark the page as secure in the hardware, 2) indicate that the page is "locked" by the UV, 3) decrypt the page, 4) set authority to a particular secure guest domain, and 5) reset the UV lock. Whenever an access is made by a secure entity, the hardware performs authorization checks on that page during translation. These checks include 1) a check to verify that the page does indeed belong to the secure guest domain which is trying to access it and 2) a check to make sure the hypervisor has not changed the host mapping of this page while this page has been resident in guest memory. Once a page is marked as secure, the hardware prevents access to any secure page by either the hypervisor or by a non-secure guest VM. The additional translation steps prevent access by another secure VM and prevent remapping by the hypervisor.

One or more embodiments of the present invention provide a technological improvement over existing systems that share pages in memory between a hypervisor and a guest. Such existing systems are susceptible to poorly-behaving (or malicious) hypervisors that can compromise the integrity and access of the pages. One or more embodiments of the present invention provide a secure interface control to prevent a malicious hypervisor from accessing secure guest storage while allowing a well-behaved (on non-malicious) hypervisor to be notified that a call to the secure interface control is needed. This improves security in a hypervisor environment by preventing a malicious hypervisor from accessing secure guest storage.

A technical challenge regarding typical/contemporary hypervisor-based environments is that a hypervisor can act maliciously and access secure guest storage. One or more embodiments of the present invention address such technical challenges by using convert from secure storage (export) UVC instructions to transition a page from being accessible by a single, secure guest configuration to being encrypted and accessible by a hypervisor for paging-out. One or more embodiments of the present invention address such technical challenges by using convert to secure storage (import) UVC instructions to decrypt and assign storage to a secure guest configuration after paging-in. The techniques provided herein therefore prevent malicious hypervisors from accessing secure guest storage.

Turning now to FIG. 1, a table 100 for zone security is generally shown in accordance with one or more embodiments of the present invention. The zone-security table 100 shown in FIG. 1 is maintained by the secure interface control and is used by the secure interface control and hardware to guarantee secure access to any page accessed by a secure entity. The zone-security table 100 is indexed by the host absolute address 110. That is, there is one entry for each page of host absolute storage. Each entry includes information that is used to verify the entry as belonging to the secure entity making the access.

Further, as shown in FIG. 1, the zone-security table 100 includes a secure domain ID 120 (identifies the secure domain associated with this page); a UV-bit 130 (indicates that this page was donated to the secure interface control and is owned by the secure interface control); a disable address compare (DA)-bit 140 (used to disable the host address pair compare in certain circumstances such as when a secure interface control page that is defined as host absolute does not have an associated host virtual address); a shared (SH)-bit 150 (indicates that the page is shared with the non-secure hypervisor) and a host virtual address 160 (indicates the host virtual address registered for this host absolute address, which is referred to as the host-address pair). Note that a host-address pair indicates a host absolute and associated, registered host virtual address. The host-address pair represents the mapping of this page, once imported by the hypervisor, and the comparison guarantees that the host does not remap that page while it is being used by the guest.

Dynamic address translation (DAT) is used to map virtual storage to real storage. When a guest VM is running as a pageable guest under the control of a hypervisor, the guest uses DAT to manage pages resident in its memory. In addition, the host, independently, uses DAT to manage those guest pages (along with its own pages) when the pages are resident in its memory. The hypervisor uses DAT to provide isolation and/or sharing of storage between different VMs as well as to prevent guest access to hypervisor storage. The hypervisor has access to all of the guests' storage when guests are running in a non-secure mode.

DAT enables isolation of one application from another while still permitting them to share common resources. Also, it permits the implementation of VMs, which may be used in the design and testing of new versions of OSs along with the concurrent processing of application programs. A virtual address identifies a location in virtual storage. An address space is a consecutive sequence of virtual addresses, together with the specific transformation parameters (including DAT tables) which allow each virtual address to be translated to an associated absolute address which identifies that address with a byte location in storage.

DAT uses a multi-table lookup to translate the virtual address to the associated absolute address. This table structure is typically defined and maintained by a storage manager. This storage manager transparently shares the absolute storage between multiple programs by paging out one page, for example, to bring in another page. When the page is paged-out, the storage manager will set an invalid bit in the associated page table, for example. When a program tries to access a page that was paged-out, the hardware will present a program interruption, often referred to as a page fault, to the storage manager. In response, the storage manager will page-in the requested page and reset the invalid bit. This is all done transparent to the program and allows the storage manager to virtualize the storage and share it among various different users.

When a virtual address is used by a CPU to access main storage, it is first converted, by means of DAT, to a real address, and then, by means of prefixing, to an absolute address. The designation (origin and length) of the highest-level table for a specific address space is called an address-space-control element (ASCE) and defines the associated address space.

Figure 2:
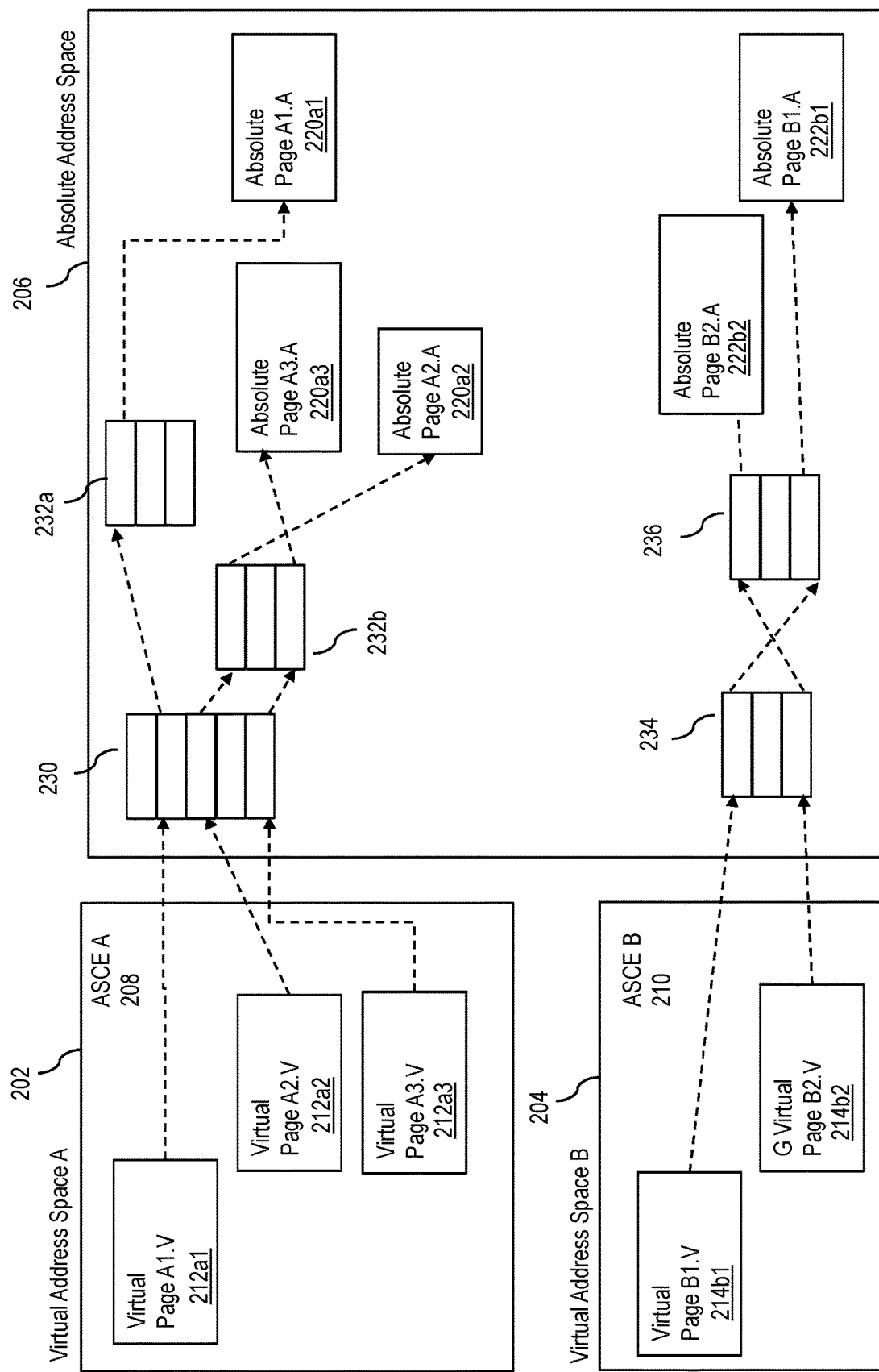
FIG. 2 depicts virtual and absolute address spaces for performing DAT according to one or more embodiments of the present invention.

Turning now to FIG. 2, example virtual address spaces 202 and 204 and an absolute address space 206 for performing DAT are generally shown in accordance with one or more embodiments of the present invention. In the example shown in FIG. 2, there are two virtual address spaces: virtual address space 202 (defined by address space control element (ASCE) A 28) and virtual address space 204 (defined by ASCE B 210). Virtual pages A1.V 212*a*1, A2.V 212*a*2, and A3.V 212*a*3 are mapped, by the storage manager in a multi-table (segment 230 and page tables 232*a*, 232*b*) lookup, using ASCE A 208 to absolute pages A1.A 220*a*1, A2.A 220*a*1 and A3.A 220*a*1. Similarly, virtual pages B1.V 214*b*1 and B2.V 214*b*2 are mapped in a two-table 234 and 236 lookup, using ASCE B 210 to absolute pages B1.A 222*b*1 and B2.A 222*b*2, respectively.

Figure 3:
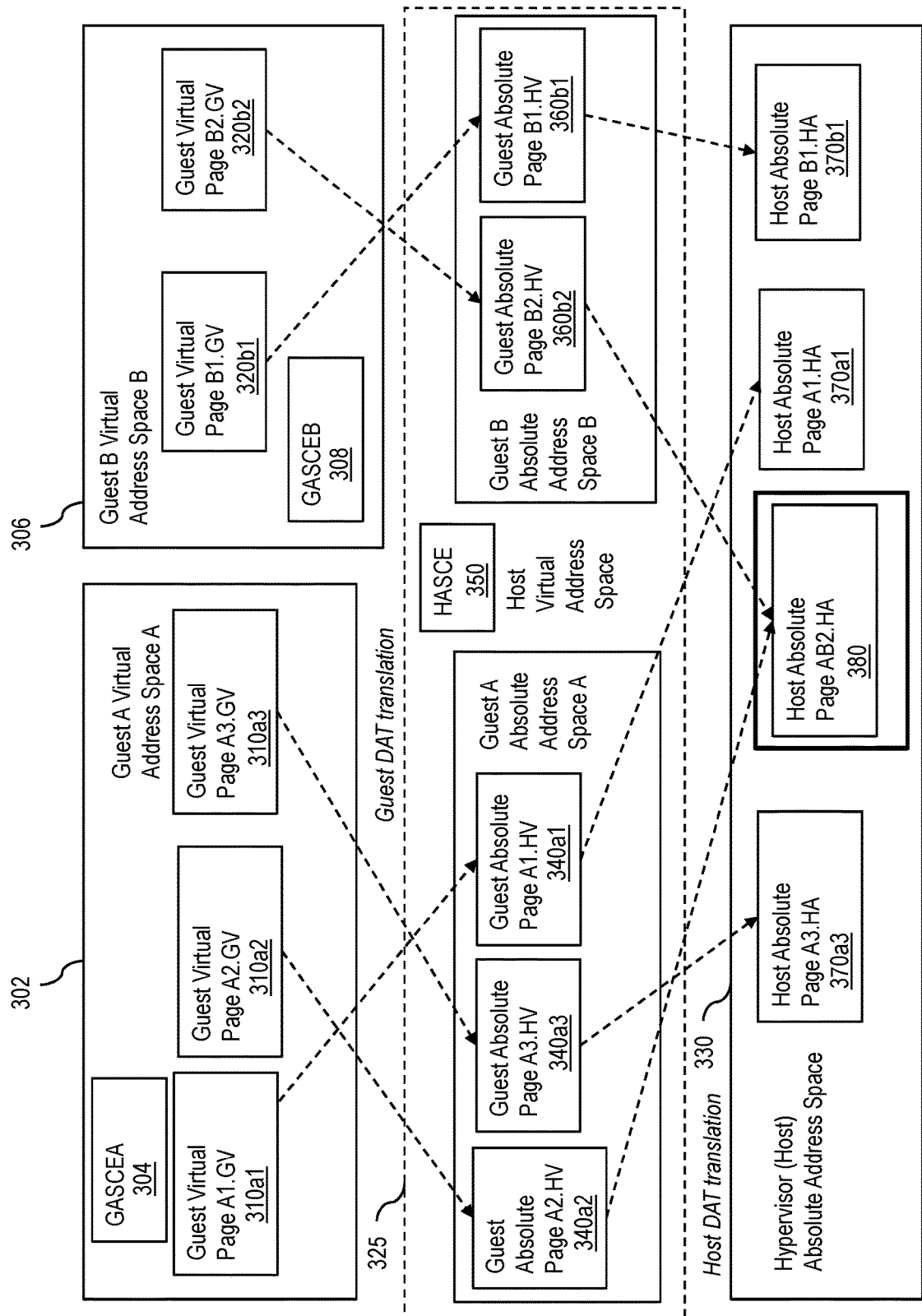
FIG. 3 depicts a nested, multi-part DAT to support a virtual machine (VM) running under a hypervisor according to one or more embodiments of the present invention.

Turning now to FIG. 3, an example of a nested, multi-part DAT translation used to support a VM running under a hypervisor is generally shown in accordance with one or more embodiments of the present invention. In the example shown in FIG. 3, guest A virtual address space A 302 (defined by guest ASCE (GASCE) A 304) and guest B virtual address space B 306 (defined by GASCEB 308) both reside in a shared host (hypervisor) virtual address space 325. As shown, virtual page A1.GV 310*a*1, A2.GV 310*a*2, and A3.GV 310*a*3, belonging to guest A, are mapped, by the guest A storage manager, using GASCEA 304 to guest absolute pages A1.HV 340*a*1, A2.HV 340*a*2, and A3.HV 340*a*3, respectively; virtual page B1.GV 320*b*1 and B2.GV 320*b*1, belonging to guest B, are mapped, independently by the guest B storage manager, using GASCEB 308 to guest absolute pages B1.HV 360*b*1 and B2.HV 360*b*2, respectively. In this example, these guest absolute pages map directly into the shared host virtual address space 325 and subsequently go through an additional host DAT translation to a host absolute address space 330. As shown, host virtual addresses A1.HV 340*a*1, A3.HV 340*a*3, and B1.HV 360*b*1 are mapped, by the host storage manager using host ASCE (HASCE) 350 to A1.HA 370*a*1, A3.HA 370*a*3, and B1.HA 370*b*1. Host virtual address A2.HV 340*a*2, belonging to guest A, and B2.HV 360*b*2, belonging to guest B, are both mapped to the same host absolute page AB2.HA 380. This enables data to be shared between these two guests. During the guest DAT translation, each of the guest table addresses is treated as a guest absolute and undergoes an additional, nested host DAT translation.

Embodiments of the present invention described herein provide secure guest storage protection. Access to secure storage by non-secure guests and the hypervisor is prohibited. The hypervisor provides that, for a given resident secure guest page, the following occurs. The associated host absolute address is only accessible through a single hypervisor (host) DAT mapping. That is, there is a single host virtual address that maps to any given host absolute address assigned to a secure guest. The hypervisor DAT mapping (host virtual to host absolute) associated with a given secure guest page does not change while it is paged-in. The host absolute page associated with a secure guest page is mapped for a single secure guest.

Sharing of storage between secure guests is also prohibited according to one or more embodiments of the present invention. Storage is shared between a single secure guest and the hypervisor under control of the secure guest.

Figure 4:
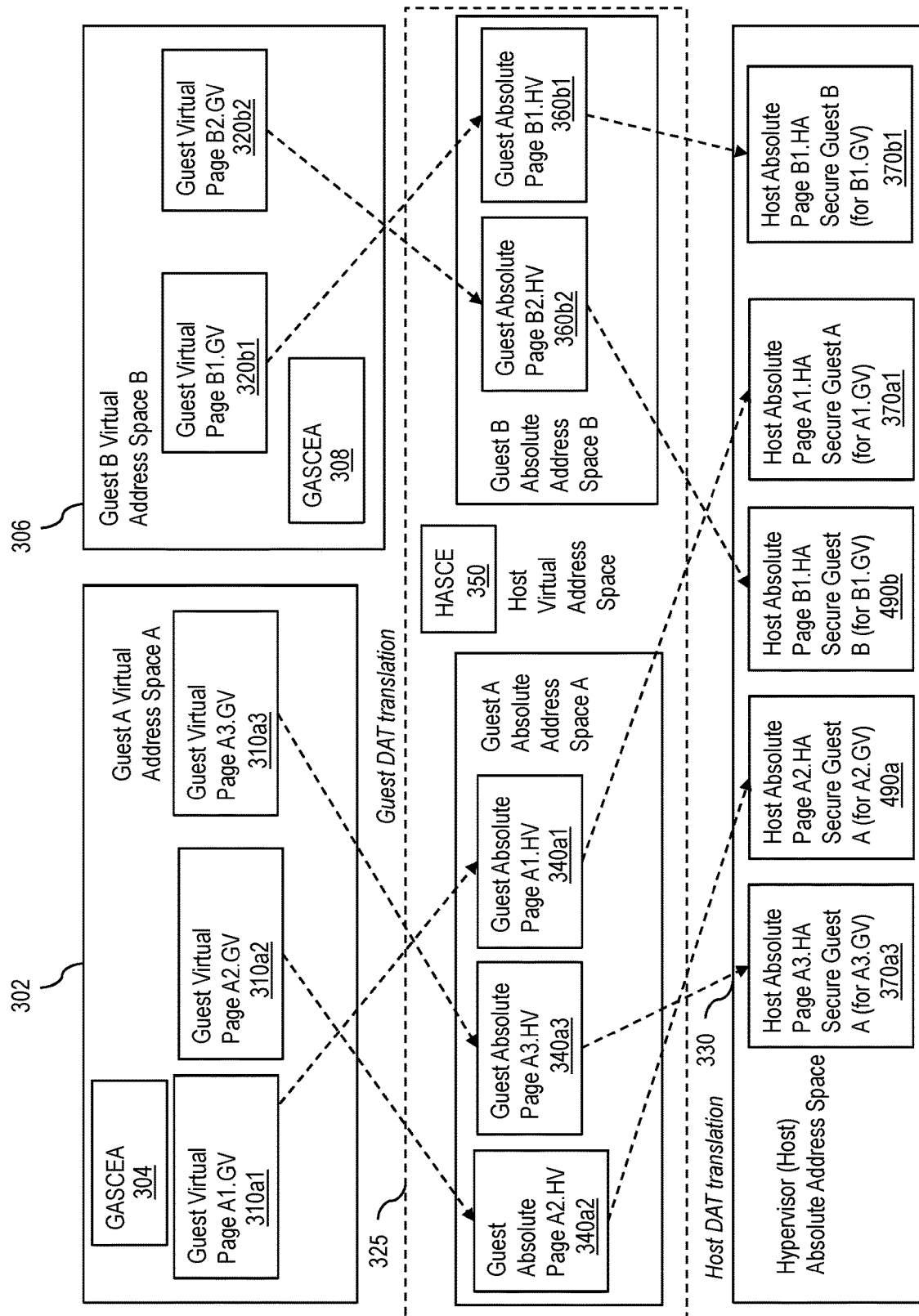
FIG. 4 depicts a mapping of secure guest storage according to one or more embodiments of the present invention.

Turning now to FIG. 4, an example of mapping of secure guest storage is generally shown in accordance with one or more embodiments of the present invention. FIG. 4 resembles FIG. 3, except that the example of FIG. 4 does not allow for sharing of storage between secure guest A and secure guest B. In the non-secure example of FIG. 3, both host virtual address A2.HV 340a2, belonging to guest A, and B2.HV 360b2, belonging to guest B, are mapped to the same host absolute page AB2.HA 380. In the secure guest storage example of FIG. 4, host virtual address A2.HV 340a2, belonging to guest A, maps to host absolute address A2.HA 490a, whereas B2.HV 360b2, belonging to guest B, maps to its own B2.HA 490b. In this example, there is no sharing between secure guests.

While the secure guest page resides on disk, it is encrypted. When the hypervisor pages-in a secure guest page, it issues a UVC, which causes the secure control interface to mark the page as secure (unless shared), decrypt it (unless shared), and register it (in the zone-security table) as belonging to the appropriate secure guest (guest A, for example). In addition, it registers the associated host virtual address (A3.HV 340a3, for example) to that host absolute page (referred to as host-address pair). If the hypervisor fails to issue the correct UVC, it receives an exception when trying to access the secure guest page. When the hypervisor pages out a guest page, a similar UVC is issued which encrypts the guest page (unless shared) before marking the guest page as non-secure and registering it in the zone-security table as non-secure.

In an example having five given host absolute pages K, P, L, M, and N, each of the host absolute pages are marked as secure by the secure control interface when the hypervisor pages them in. This prevents non-secure guests and the hypervisor from accessing them. Host absolute pages K, P, and M are registered as belonging to guest A when the hypervisor pages them in; host absolute pages L and N are registered to guest B when paged-in by the Hypervisor. Shared pages, pages shared between a single secure guest and the hypervisor, are not encrypted or decrypted during paging. They are not marked as secure (allows access by hypervisor) but are registered with a single secure guest domain in the zone-security table.

In accordance with one or more embodiments of the present invention, when a non-secure guest or the hypervisor tries to access a page that is owned by a secure guest, the hypervisor receives a secure-storage access (PIC3D) exception. No additional translation step is required to determine this.

In accordance with one or more embodiments, when a secure entity tries to access a page, the hardware performs an additional translation check that verifies that the storage does indeed belong to that particular secure guest. If not, a non-secure access (PIC3E) exception is presented to the hypervisor. In addition, if the host virtual address being translated does not match the host virtual address from the registered host-address pair in the zone-security table, a secure-storage violation ('3F'x) exception is recognized. To enable sharing with the hypervisor, a secure guest may access storage that is not marked as secure as long as the translation checks allow for access.

Figure 5A:
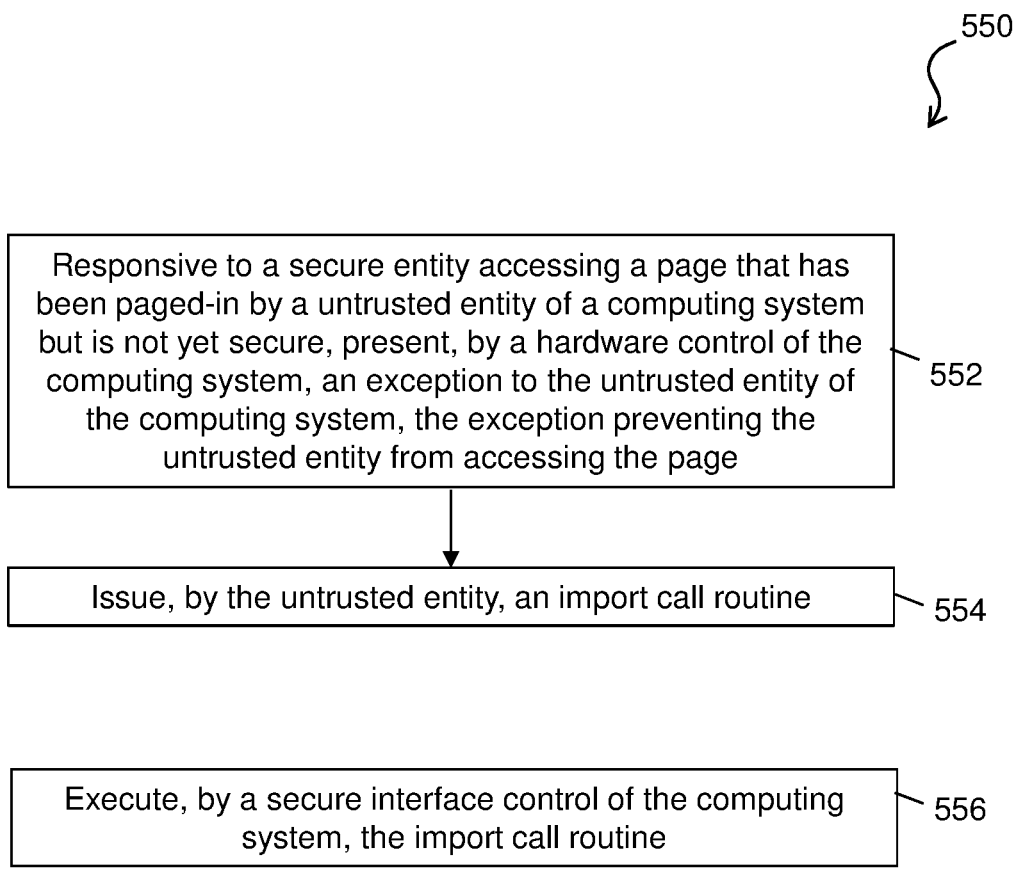
FIGS. 5A and 5B depicts process flows of an import operation according to one or more embodiments of the present invention.

Turning now to FIG. 5A, a process flow 550 for an import operation is generally shown according to one or more embodiments of the present invention. At block 552, responsive to a secure entity accessing a secure page that has been paged-in by a untrusted entity of a computing system, a hardware interface of the computing system presents an exception to the untrusted entity of the computing system. The exception prevents an untrusted entity from accessing the secure page. At block 554, the untrusted entity issues an import call routine, which is described further herein. At block 556, a secure interface control of the computing system executes the import call routine.

Figure 5B:
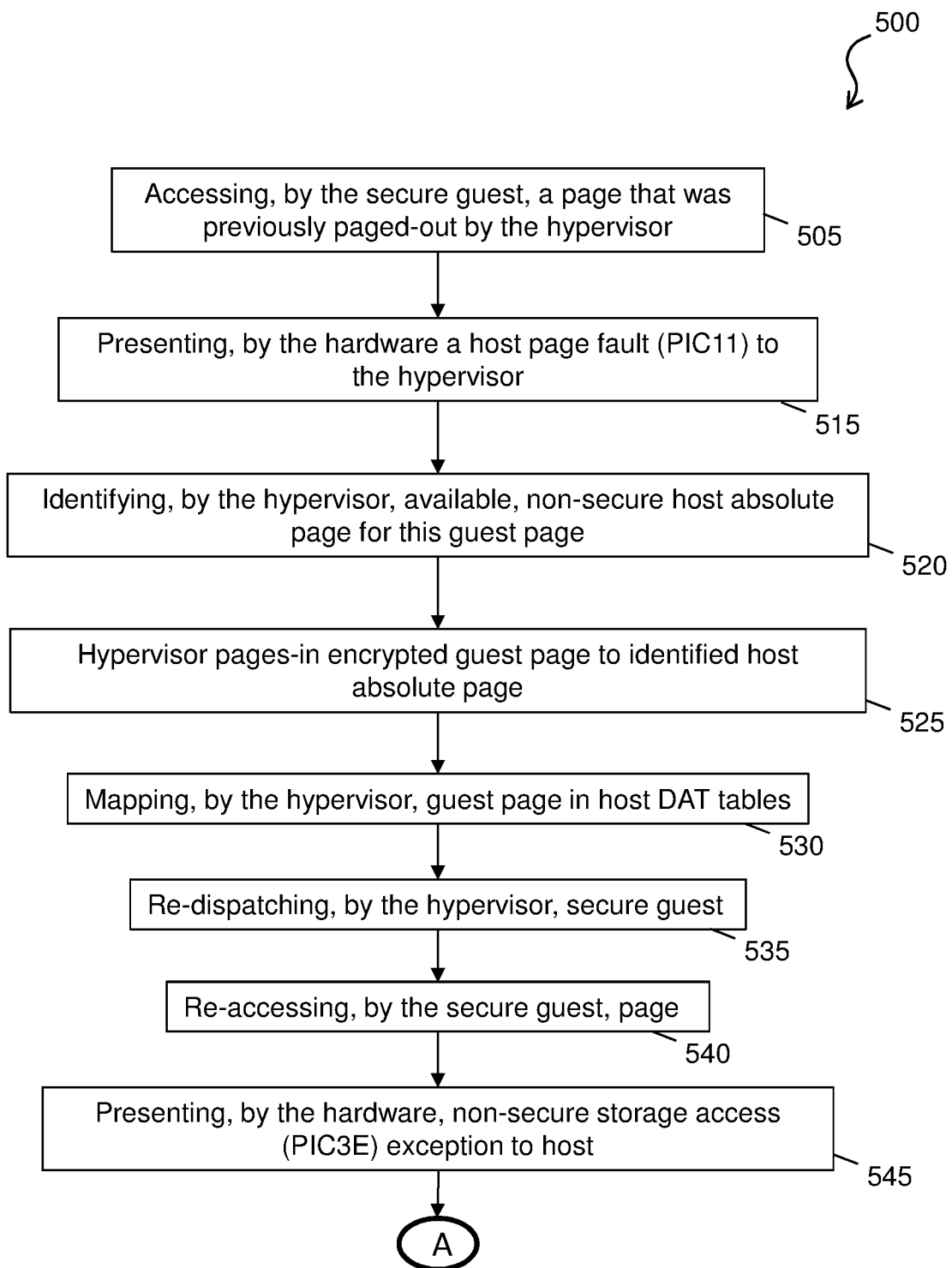

FIG. 5B further depicts a process flow 500 of an import operation according to one or more embodiments of the present invention. When a secure guest accesses a page that was paged-out by the hypervisor, a sequence of events such as that shown in the process flow 500 occur in order to securely bring that page back in. The process flow 500 beings at block 505, where the secure guest accesses the guest virtual page. Since the page, for example, is invalid, the hardware presents a host page fault, indicated by program-interruption-code 11 (PIC11), to the hypervisor (see block 515). The hypervisor, in turn, identifies an available non-secure host absolute page for this guest page (see block 520) and pages-in the encrypted guest page to the identified host absolute page (see block 525).

At block 530, the host absolute page is then mapped in the appropriate (based on host virtual address) host DAT tables. At block 535, the hypervisor host then re-dispatches the secure guest. At block 540, the secure guest re-accesses the guest secure page. The page fault no longer exists but since this a secure guest access and the page is not marked as secure in the zone-security table 100 of FIG. 100, the hardware presents a non-secure-storage exception (PIC3E) to the hypervisor at block 545. This PIC3E prevents access by the guest to this secure page until the necessary import has been issued. Next, the process flow 500 proceeds to "A", which is connected to FIG. 6.

Figure 6:
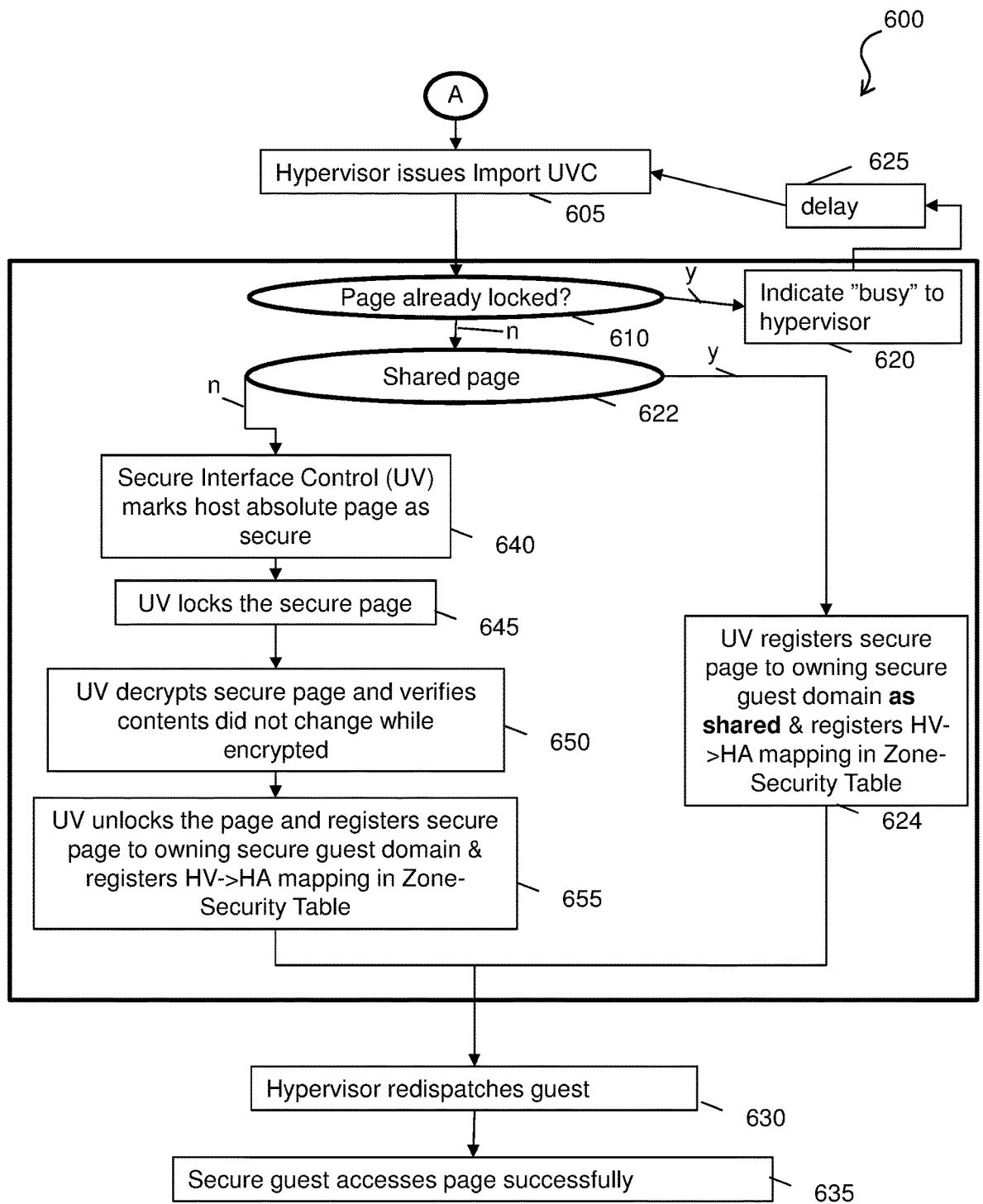
FIG. 6 depicts a process flow of an import operation according to one or more embodiments of the present invention.

Turning now to FIG. 6, a process flow 600 for performing an import operation is generally shown in accordance with one or more embodiments of the present invention. A well-behaved hypervisor (e.g., performing in an expected manner without errors), in response to the PIC3E, will issue an import UVC (see block 605). Note that at this point, a page to be imported is marked as non-secure and can only be accessed by the hypervisor, other non-secure entities, and the secure interface control. It cannot be accessed by secure guests.

As part of the import UVC, the trusted firmware acting as the secure interface control checks to see if this page is already locked by the secure interface control (see decision block 610). If it is, the process flow 600 proceeds to block 620. At block 620, a "busy" return code is returned to the hypervisor that will, in response, delay (see block 625) and reissue the Import UVC (the process flow 600 returns to block 605). If the page is not already locked then, the process flow 600 proceeds to decision block 622.

At decision block 622, the secure interface control checks to see if the page is a page which is shared with the non-secure hypervisor. If it is shared (the process flow 600 proceeds to decision block 624), the secure interface control registers the host absolute address in the zone-security table with the associated secure guest domain, host virtual address and as shared. This page remains marked as non-secure. This completes the import UVC and the page is now available to be accessed by the guest. Processing continues with the hypervisor re-dispatching guest (block 630) and the secure guest accessing the page successfully (block 635).

If the host virtual page to be imported is not shared with the hypervisor (the process flow 600 proceeds to block 640), the secure interface control will mark the page as secure, so that the hypervisor can no longer access the page. At block 645, the secure interface control locks the page, so that no other UVC can modify the page status. Once the lock is set (at block 650), the secure interface control will verify that the contents of the guest page did not change while it was encrypted. If they did change then an error return code is returned to the hypervisor, otherwise, the secure interface control will decrypt the secure page.

At block 655, the secure interface control unlocks the page, allowing access by other UVCs, registers the page in the zone-security table, as secure and associated with the appropriate guest domain and host virtual address to complete the host-address HV→HA pair. This allows access by the guest and completes the UVC.

Figure 7:
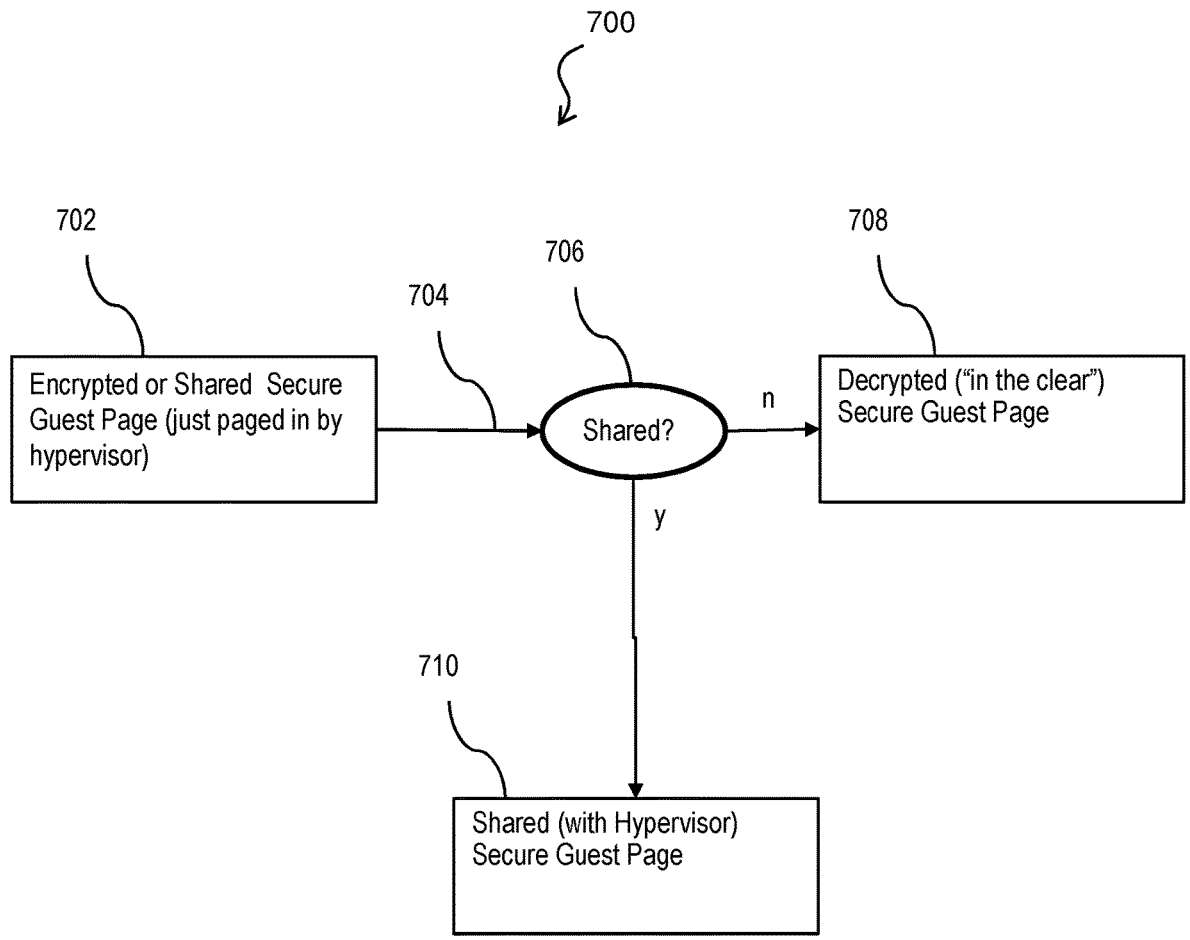
FIG. 7 depicts a process flow of transition to secure guest page according to one or more embodiments of the present invention.

FIG. 7 depicts a process flow 700 of transition to secure guest page according to one or more embodiments of the present invention. An encrypted or shared secure guest page is paged in by the hypervisor (702). The page is currently marked as non-secure (NS) and is registered in the zone security table as non-secure and non-shared. The page can be accessed by non-secure entities (including the hypervisor). A host exception is presented if the page is accessed by a secure entity. The page is converted to secure storage (imported) using the Import UVC (704). As part of the Import UVC, it is determined, by the secure interface control, whether the page is shared (706). If the page is not shared, the page is decrypted and marked as a secure guest page (i.e., the page is now "in the clear") (block 708). In particular, in order to protect this page while it is in the clear, the page is marked by the secure interface control as secure and is registered in the zone security table as secure, non-shared with associated secure guest domain and HV→HA mapping. However, when a page is shared, i.e., it is shared between the hypervisor and a single secure guest, it can be accessed by any non-secure entity including the hypervisor (710). The page remains marked as non-secure, to allow access by the hypervisor, and is registered in the zone security table as shared with associated secure guest domain and HV→HA mapping.

Figure 8A:
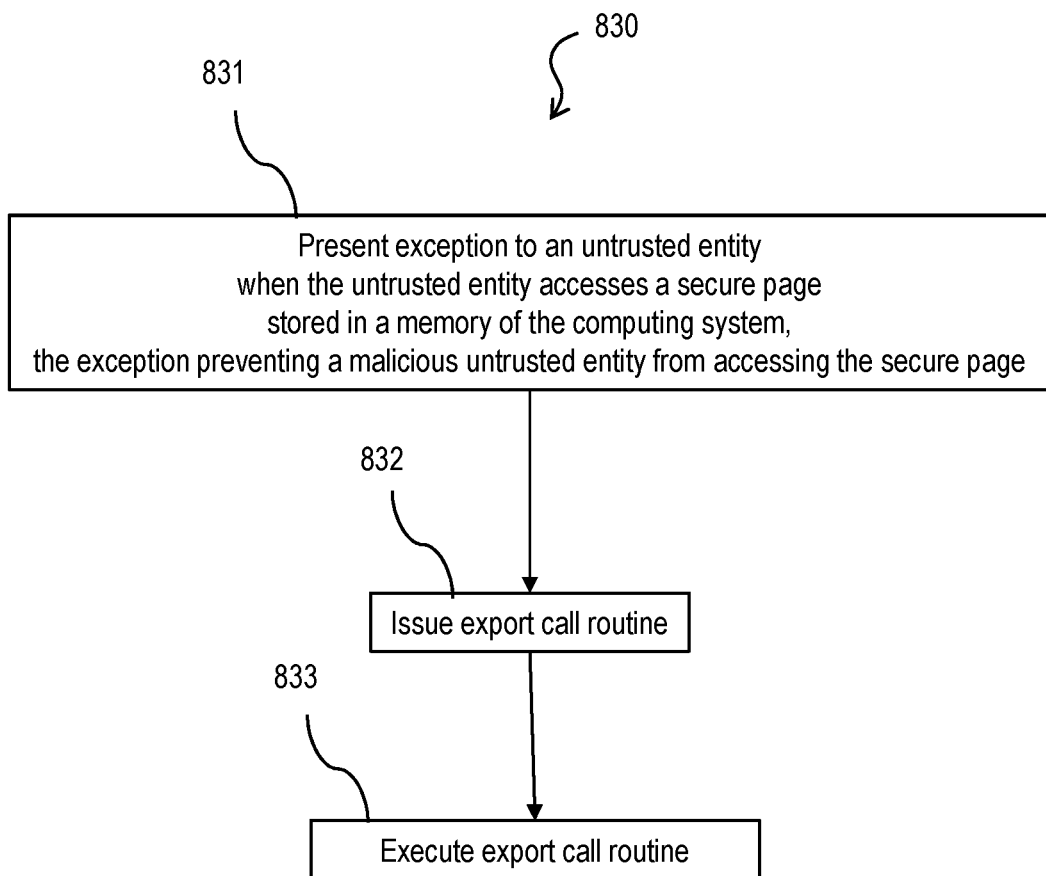
FIG. 8A depict a process flow of paging out a guest's secure (decrypted) page according to one or more embodiments of the present invention.

FIG. 8A depict a process flow 830 of paging out a guest's secure (decrypted) page according to one or more embodiments of the present invention. In the new secure environment described herein, whenever the hypervisor is paging-out a secure page, it is required to issue a new convert from secure storage (export) UVC. To do this, the process flow 800 is implemented. At block 831, a hardware control of a computing system presents an exception to an untrusted entity when the untrusted entity accesses a secure page stored in a memory of the computing system, the exception preventing an untrusted entity from accessing the secure page. At block 832, the untrusted entity issues an export call routine. At block 833, a secure interface control of the computing system executes the export call routine (i.e., the convert from secure storage (export) UVC).

Figure 8B:
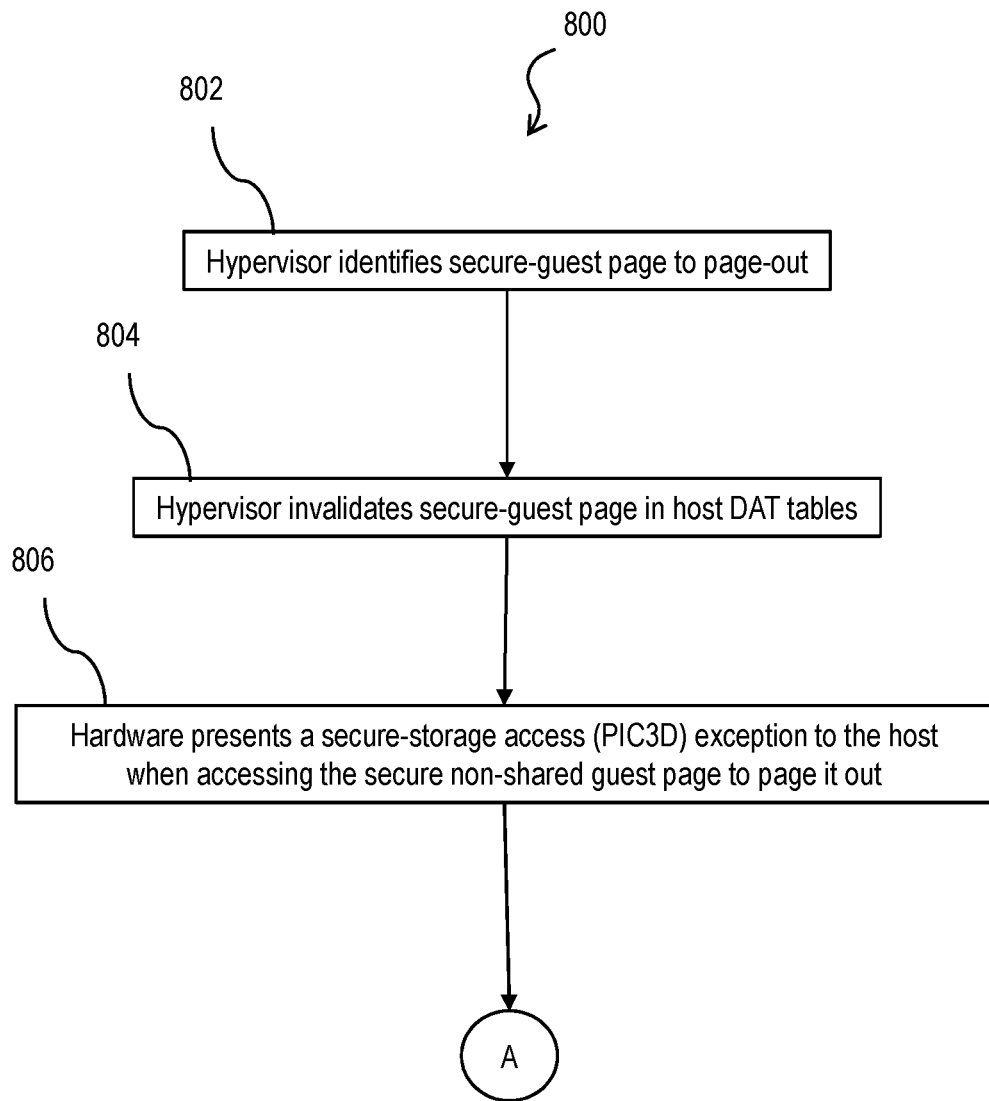
FIGS. 8B and 8C depict a process flow of an export operation according to one or more embodiments of the present invention.
Figure 8C:
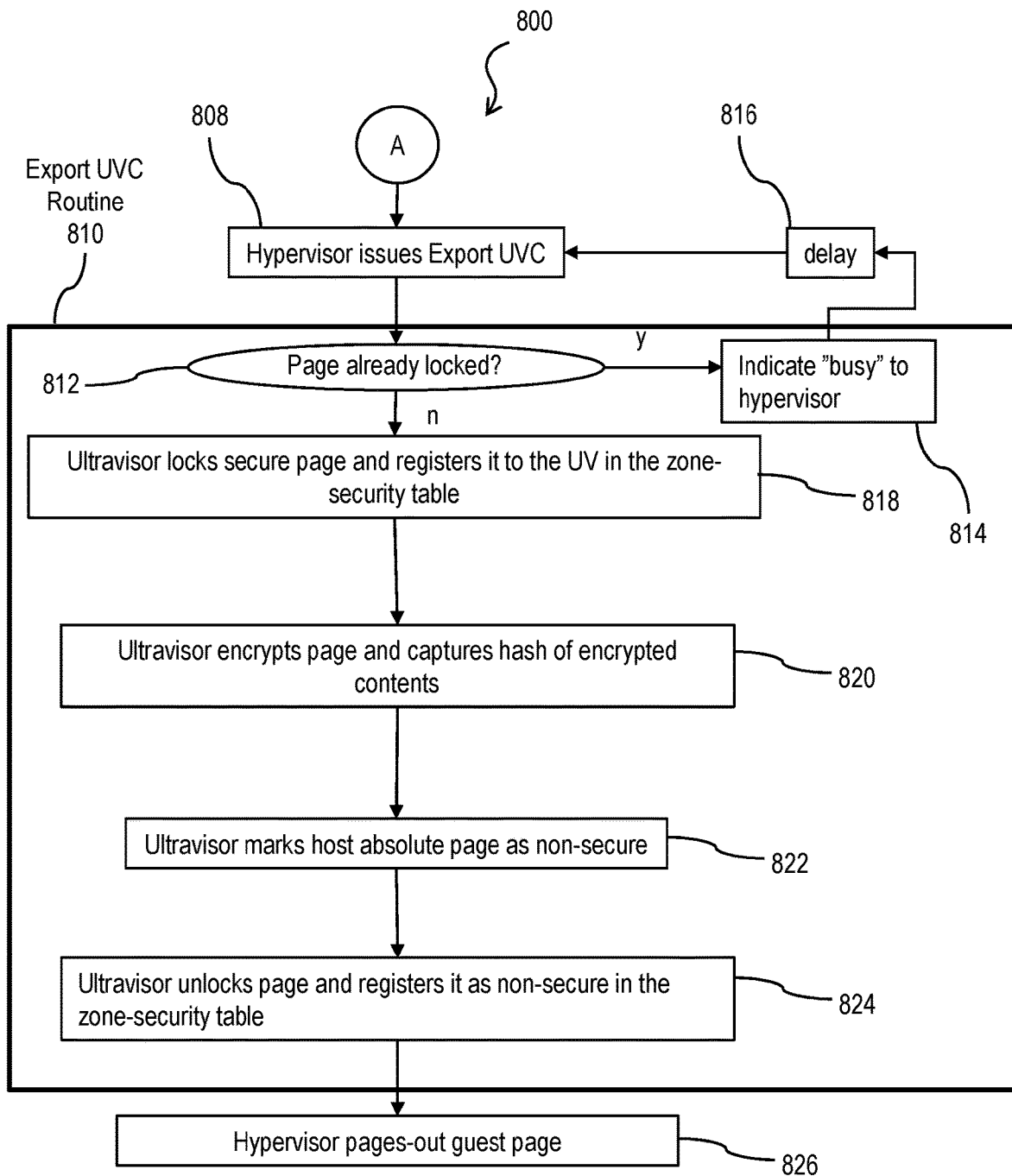

FIGS. 8B and 8C depict a process flow 800 of an export UVC routine 810 used to page out a page according to one or more embodiments of the present invention. The hypervisor identifies a secure-guest page to page out (802), and the hypervisor invalidates the secure-guest page in host DAT tables (804). Hardware presents a secure-storage access (PIC3D) exception to the host when the host accesses the secure non-shared guest page to page it out (806), and, in response, the hypervisor issues an export UVC (808). The export UVC routine 810, executed by the secure interface control, then begins.

In particular, the export UVC routine 810 begins by determining whether the page is already locked by the secure interface control. If so, a "busy" indicator is indicated to the hypervisor (814), and the hypervisor waits a delay (816) before trying to issue the export UVC again (808). If the page is not locked, the UV locks the secure page and registers it as belonging to the UV in the zone-security table (818). The secure guest can no longer access the page and no other UVCs can operate on the host absolute page. The UV encrypts the page and captures a hash of encrypted contents of the page (820). The UV then marks the host absolute page as non-secure (822). The hypervisor can now access the page. Next, the UV unlocks the page and registers it as non-secure in the zone-security table (824). The secure guest can still not access the page, but the secure interface control can. The page can be imported for the guest if so requested. The export UVC routine 810 ends, and the hypervisor pages-out the guest page (826).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, VMs, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
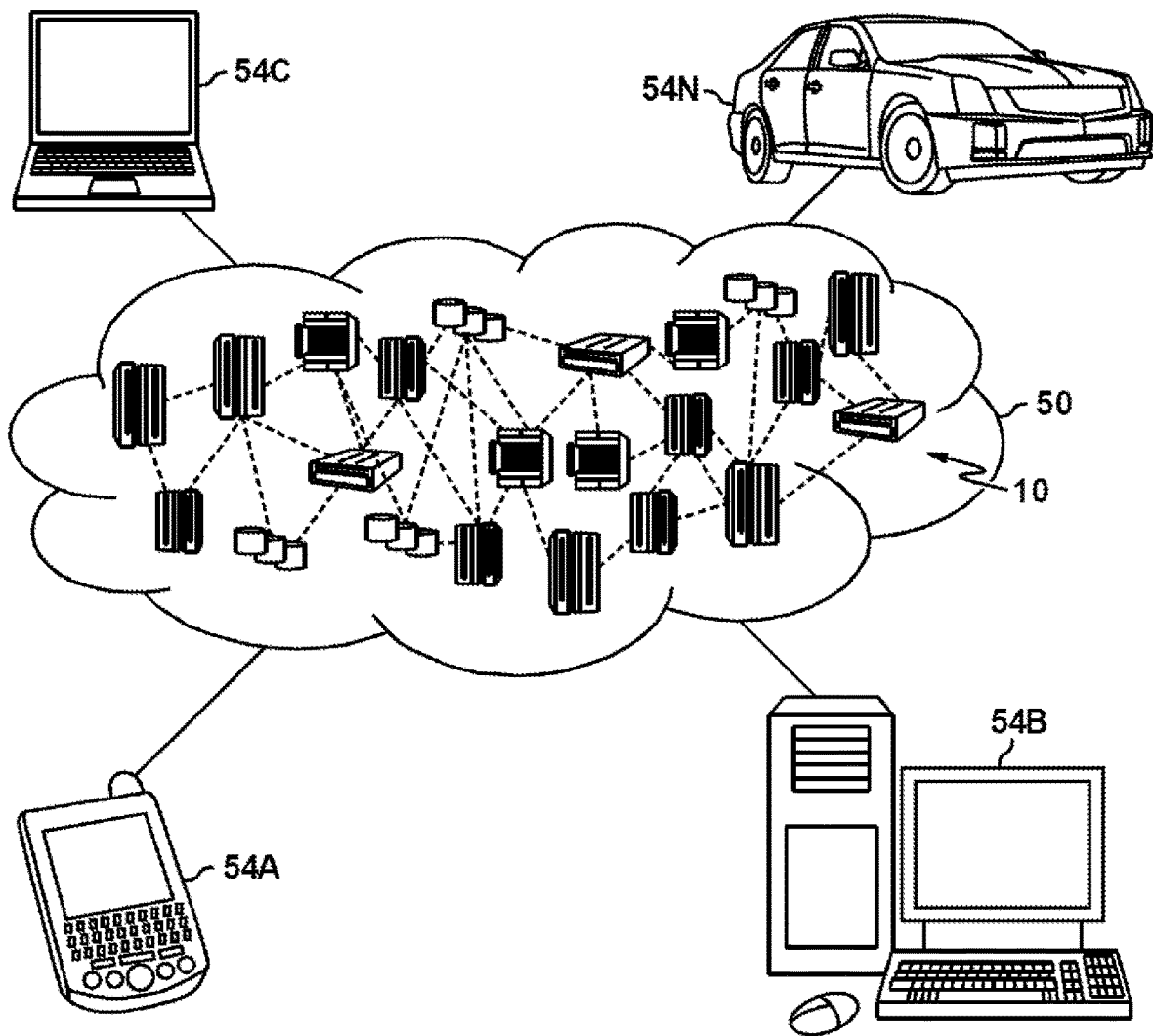
FIG. 9 depicts a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
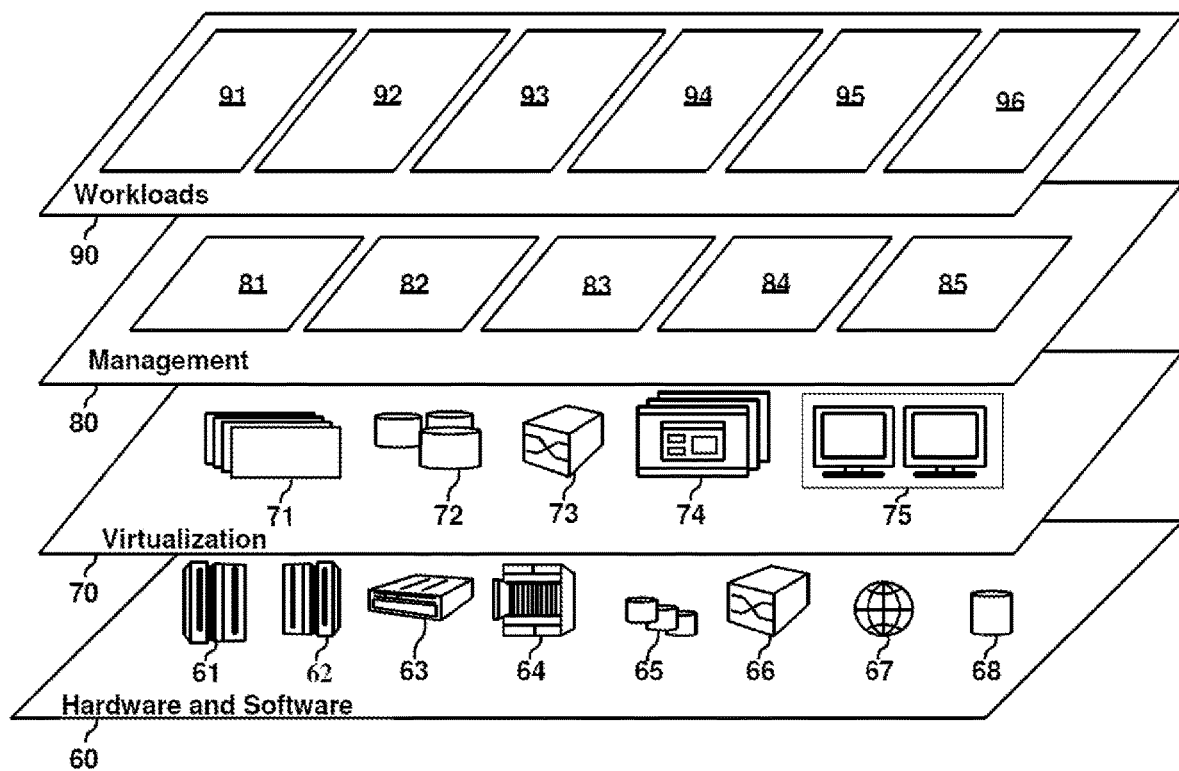
FIG. 10 depicts abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and program interruptions for importing/exporting pages 96. It is understood that these are just some examples and that in other embodiments, the layers can include different services.

Figure 11:
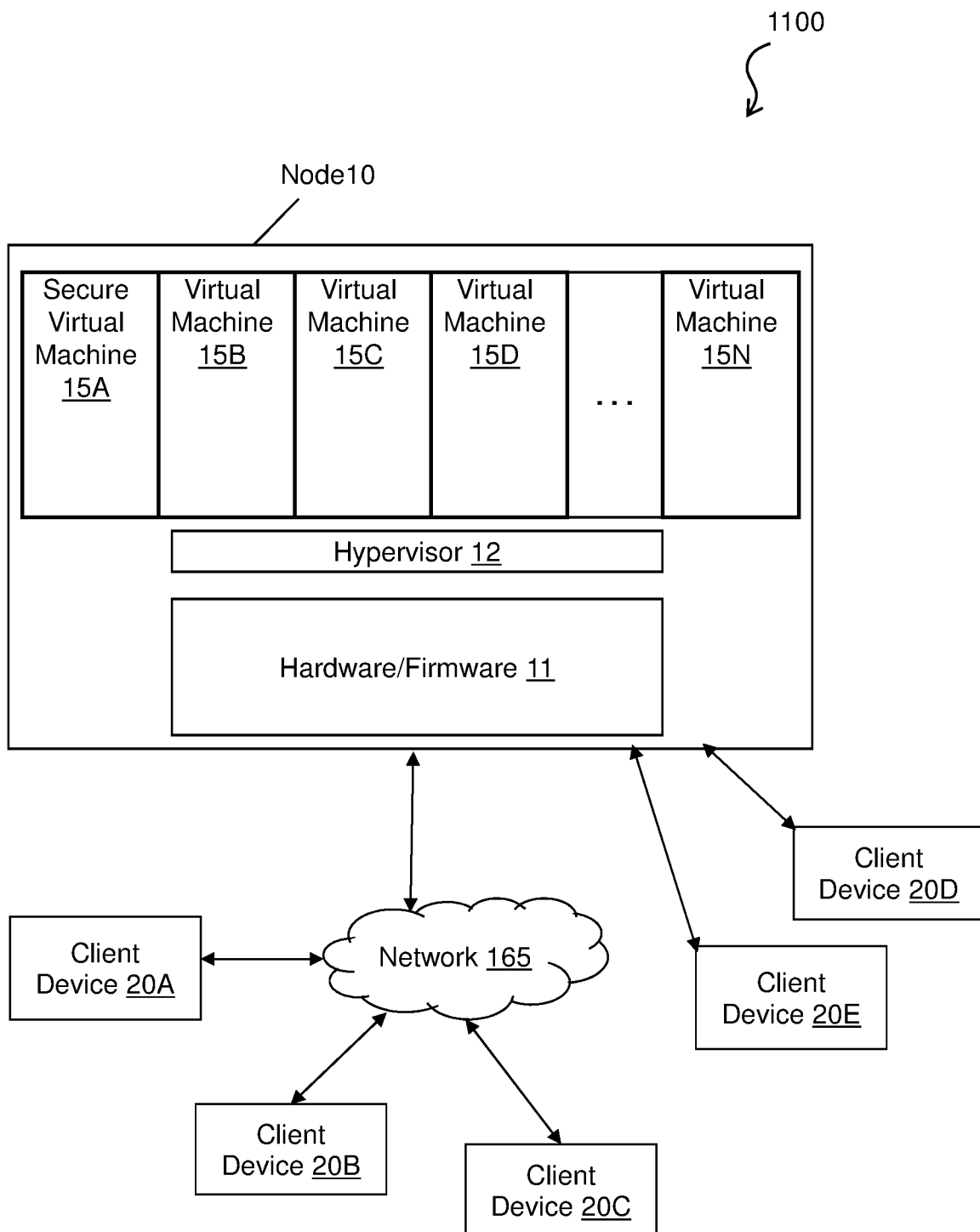
FIG. 11 depicts a system according to one or more embodiments of the present invention.

Turning now to FIG. 11, a system 1100 is depicted in accordance with one or more embodiments of the present invention. The system 1100 includes an example node 10 (e.g., a hosting node) that is in direct or indirect communication with one or more client devices 20A-20E, such as via a network 165. The node 10 can be a datacenter or host server, of a cloud-computing provider. The node 10 executes a hypervisor 12, which facilitates deploying one or more VMs 15 (15A-15N). The node 10 further includes a hardware/firmware layer 11 that provides direct support for functions required by the VMs 15A-N and hypervisor 12 as well as facilitates the hypervisor 12 in providing one or more services to the VMs 15. In contemporary implementations communication is provided between the hardware/firmware layer 11 and the hypervisor 12, between the hardware/firmware layer 11 and the VMs 15, between the hypervisor 12 and the VMs 15, and between the hypervisor 12 and the VMs 15 via the hardware/firmware layer 11. In accordance with one or more embodiments, of the present invention, a secure interface control is provided in the hardware/firmware layer 11, and the direct communication between the hypervisor 12 and the VMs 15 is eliminated.

For example, the node 10 can facilitate a client device 20A to deploy one or more of the VMs 15A-15N. The VMs 15A-15N may be deployed in response to respective requests from distinct client devices 20A-20E. For example, the VM 15A may be deployed by the client device 20A, the VM 15B may be deployed by the client device 20B, and the VM 15C may be deployed by the client device 20C. The node 10 may also facilitate a client to provision a physical server (without running as a VM). The examples described herein embody the provisioning of resources in the node 10 as part of a VM, however the technical solutions described can also be applied to provision the resources as part of a physical server.

In an example, the client devices 20A-20E may belong to the same entity, such as a person, a business, a government agency, a department within a company, or any other entity, and the node 10 may be operated as a private cloud of the entity. In this case, the node 10 solely hosts VMs 15A-15N that are deployed by the client devices 20A-20E that belong to the entity. In another example, the client devices 20A-20E may belong to distinct entities. For example, a first entity may own the client device 20A, while a second entity may own the client device 20B. In this case, the node 10 may be operated as a public cloud that hosts VMs from different entities. For example, the VMs 15A-15N may be deployed in a shrouded manner in which the VM 15A does not facilitate access to the VM 15B. For example, the node 10 may shroud the VMs 15A-15N using an IBM z Systems® Processor Resource/Systems Manager (PRISM) Logical Partition (LPAR) feature. These features, such as PR/SM LPAR provide isolation between partitions, thus facilitating the node 10 to deploy two or more VMs 15A-15N for different entities on the same physical node 10 in different logical partitions.

A client device 20A from the client devices 20A-20e is a communication apparatus such as a computer, a smartphone, a tablet computer, a desktop computer, a laptop computer, a server computer, or any other communication apparatus that requests deployment of a VM by the hypervisor 12 of the node 10. The client device 20A may send a request for receipt by the hypervisor via the network 165. A VM 15A, from the VMs 15A-15N is a VM image that the hypervisor 12 deploys in response to a request from the client device 20A from the client devices 20A-20e. The hypervisor 12 is a VM monitor (VMM), which may be software, firmware, or hardware that creates and runs VMs. The hypervisor 12 facilitates the VM 15A to use the hardware components of the node 10 to execute programs and/or store data. With the appropriate features and modifications the hypervisor 12 may be IBM z Systems®, ORACLE VM SERVER™, CITRIX XENSERVER™, VMWARE ESX™, MICROSOFT HYPER-V™, or any other hypervisor. The hypervisor 12 may be a native hypervisor executing on the node 10 directly, or a hosted hypervisor executing on another hypervisor.

Figure 12:
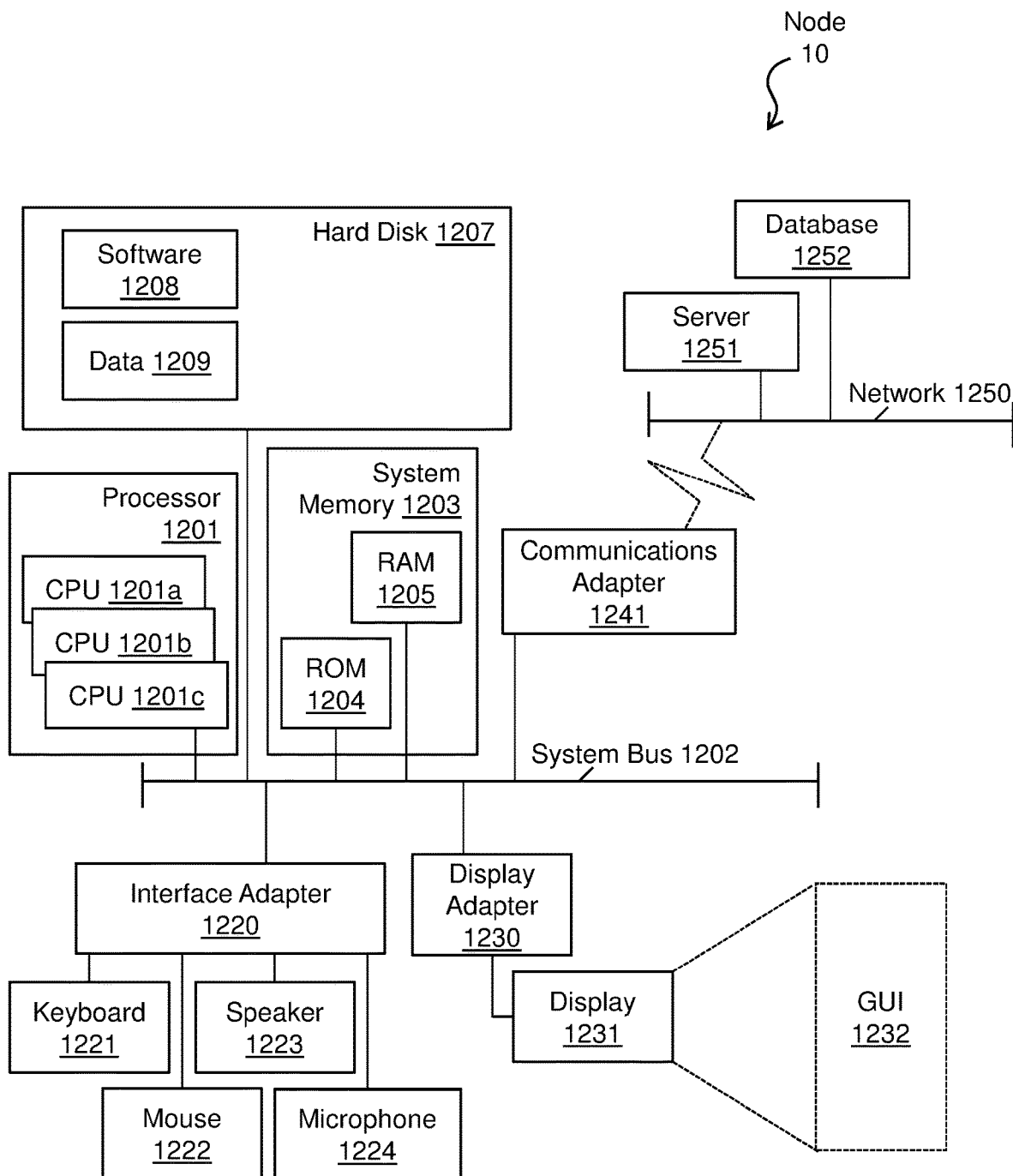
FIG. 12 depicts a processing system according to one or more embodiments of the present invention.

Turning now to FIG. 12, a node 10 for implementing the teachings herein is shown in according to one or more embodiments of the invention. The node 10 can be an electronic, computer framework comprising and/or employing any number and combination of computing device and networks utilizing various communication technologies, as described herein. The node 10 can be easily scalable, extensible, and modular, with the ability to change to different services or reconfigure some features independently of others.

In this embodiment, the node 10 has a processor 1201, which can include one or more central processing units (CPUs) 1201a, 1201b, 1201c, etc. The processor 1201, also referred to as a processing circuit, microprocessor, computing unit, is coupled via a system bus 1202 to a system memory 1203 and various other components. The system memory 1203 includes read only memory (ROM) 1204 and random access memory (RAM) 1205. The ROM 1204 is coupled to the system bus 1202 and may include a basic input/output system (BIOS), which controls certain basic functions of the node 10. The RAM is read-write memory coupled to the system bus 1202 for use by the processor 1201.

The node 10 of FIG. 12 includes a hard disk 1207, which is an example of a tangible storage medium readable executable by the processor 1201. The hard disk 1207 stores software 1208 and data 1209. The software 1208 is stored as instructions for execution on the node 10 by the processor 1201 (to perform process, such as the process flows of FIGS. 5, 8A, 8B, and 8C). The data 1209 includes a set of values of qualitative or quantitative variables organized in various data structures to support and be used by operations of the software 1208.

The node 10 of FIG. 12 includes one or more adapters (e.g., hard disk controllers, network adapters, graphics adapters, etc.) that interconnect and support communications between the processor 1201, the system memory 1203, the hard disk 1207, and other components of the node 10 (e.g., peripheral and external devices). In one or more embodiments of the present invention, the one or more adapters can be connected to one or more I/O buses that are connected to the system bus 1202 via an intermediate bus bridge, and the one or more I/O buses can utilize common protocols, such as the Peripheral Component Interconnect (PCI).

As shown, the node 10 includes an interface adapter 1220 interconnecting a keyboard 1221, a mouse 1222, a speaker 1223, and a microphone 1224 to the system bus 1202. The node 10 includes a display adapter 1230 interconnecting the system bus 1202 to a display 1231. The display adapter 1230 (and/or the processor 1201) can include a graphics controller to provide graphics performance, such as a display and management of a GUI 1232. A communications adapter 1241 interconnects the system bus 1202 with a network 1250 enabling the node 10 to communicate with other systems, devices, data, and software, such as a server 1251 and a database 1252. In one or more embodiments of the present invention, the operations of the software 1208 and the data 1209 can be implemented on the network 1250 by the server 1251 and the database 1252. For instance, the network 1250, the server 1251, and the database 1252 can combine to provide internal iterations of the software 1208 and the data 1209 as a platform as a service, a software as a service, and/or infrastructure as a service (e.g., as a web application in a distributed system).

Thus, as configured in FIG. 12, the operations of the software 1208 and the data 1209 (e.g., the node 10) are necessarily rooted in the computational ability of the processor 1201 and/or the server 1251 to overcome and address the herein-described shortcomings of the conventional hypervisor environment. In this regard, the software 1208 and the data 1209 improve computational operations of the processor 1201 and/or the server 1251 of the node 10 by preventing malicious hypervisors that cause additional processing cycles (thereby increasing efficiency of the node 10).

Embodiments described herein are necessarily rooted in computer technology, and particularly computer servers that host VMs. Further, one or more embodiments of the present invention facilitate an improvement to the operation of computing technology itself, in particular computer servers that host VMs, by facilitating the computer servers that host VMs to host secure VMs, in which even the hypervisor is prohibited from accessing memory, registers, and other such data associated with the secure VM. In addition, one or more embodiments of the present invention provide significant steps towards the improvements of the VM hosting computing servers by using a secure interface control (also referred to herein as "UV") that includes hardware, firmware (e.g., millicode), or a combination thereof to facilitate a separation of the secure VM and the hypervisor, and thus maintaining a security of the VMs hosted by the computing server. The secure interface control provides lightweight intermediate operations to facilitate the security, without adding substantial overhead to securing VM state during initialization/exit of VMs as described herein.

Embodiments of the invention disclosed herein may include system, method, and/or computer program product (herein a system) that use program interrupts for importing/ exporting pages. Note that, for each of explanation, identifiers for elements are reused for other similar elements of different figures.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   presenting, by a hardware control of a computing system, an exception to an untrusted entity when the untrusted entity accesses a secure page stored in a memory of the computing system, the exception preventing the untrusted entity from accessing the secure page;
   in response to the exception, issuing, by the untrusted entity, an export call routine, wherein the export call routine comprises registering, by a secure interface control of the computing system, the secure page to the secure interface control in a zone-security table thereby preventing a secure guest from accessing the secure page, wherein the zone-security table comprises a secure domain identifier, a secure interface control bit, a disable address compare bit, a shared bit, and a host virtual address; and
   executing, by the secure interface control of the computing system, the export call routine.

2. The computer-implemented method of claim 1, wherein the export call routine comprises:
   encrypting, by the secure interface control, the secure page.

3. The computer-implemented method of claim 2, wherein the export call routine comprises:
   prior to the encrypting, locking, by the secure interface control, the secure page; and subsequent to the encrypting, unlocking, by the secure interface control, the secure page.

4. The computer-implemented method of claim 2, wherein the export call routine comprises:
performing the registering prior to the encrypting.

5. The computer-implemented method of claim 2, wherein the export call routine comprises:
capturing, by the secure interface control, a hash of encrypted contents of the secure page.

6. The computer-implemented method of claim 2, wherein the export call routine comprises:
subsequent to the encrypting, marking, by the secure interface control, a host absolute page as non-secure.

7. The computer-implemented method of claim 2, wherein the export call routine comprises:
subsequent to the encrypting, registering, by the secure interface control, the host absolute page as non-secure in the zone-security table.

8. The computer-implemented method of claim 3, further comprising:
prior to locking the secure page, determining whether the secure page is locked;
responsive to determining that the secure page is locked, generating a busy indicator to the untrusted entity; and
waiting a delay period.

9. The computer-implemented method of claim 1, wherein the secure interface control comprises firmware, hardware, or a combination of firmware and hardware; and the untrusted entity comprises a hypervisor.

10. A system comprising:
a memory comprising computer readable instructions; and
a processing device for executing the computer readable instructions for performing a method comprising:
presenting, by a hardware control of a computing system, an exception to an untrusted entity when the untrusted entity accesses a secure page stored in a memory of the computing system, the exception preventing the untrusted entity from accessing the secure page, wherein the zone-security table comprises a secure domain identifier, a secure interface control bit, a disable address compare bit, a shared bit, and a host virtual address;
in response to the exception, issuing, by the untrusted entity, an export call routine, wherein the export call routine comprises registering, by a secure interface control of the computing system, the secure page to the secure interface control in a zone-security table thereby preventing a secure guest from accessing the secure page; and
executing, by the secure interface control of the computing system, the export call routine.

11. The system of claim 10, wherein the export call routine comprises:
encrypting, by the secure interface control, the secure page.

12. The system of claim 11, wherein the export call routine comprises:
prior to the encrypting, locking, by the secure interface control, the secure page; and
subsequent to the encrypting, unlocking, by the secure interface control, the secure page.

13. The system of claim 11, wherein the export call routine comprises:
performing the registering prior to the encrypting.

14. The system of claim 11, wherein the export call routine comprises:

capturing, by the secure interface control, a hash of encrypted contents of the secure page.

15. The system of claim 11, wherein the export call routine comprises:
subsequent to the encrypting, marking, by the secure interface control, a host absolute page as non-secure.

16. The system of claim 11, wherein the export call routine comprises:
subsequent to the encrypting, registering, by the secure interface control, the host absolute page as non-secure in the zone-security table.

17. The system of claim 12, further comprising:
prior to locking the secure page, determining whether the secure page is locked;
responsive to determining that the secure page is locked, generating a busy indicator to the untrusted entity; and
waiting a delay period.

18. The system of claim 10, wherein the secure interface control comprises firmware, hardware, or a combination of firmware and hardware; and the untrusted entity comprises a hypervisor.

19. A computer program product comprising:
a computer readable storage medium having program instructions embodied therewith, the program instructions executable by a processing device to cause the processing device to perform a method comprising:
presenting, by a hardware control of a computing system, an exception to an untrusted entity when the untrusted entity accesses a secure page stored in a memory of the computing system, the exception preventing the untrusted entity from accessing the secure page;
in response to the exception, issuing, by the untrusted entity, an export call routine, wherein the export call routine comprises registering, by a secure interface control of the computing system, the secure page to the secure interface control in a zone-security table thereby preventing a secure guest from accessing the secure page, wherein the zone-security table comprises a secure domain identifier, a secure interface control bit, a disable address compare bit, a shared bit, and a host virtual address; and
executing, by the secure interface control of the computing system, the export call routine.

20. A computer-implemented method comprising:
responsive to a secure entity accessing a page that has been paged-in by a untrusted entity of a computing system but is not yet secure, presenting, by a hardware control of the computing system, an exception to the untrusted entity of the computing system, the exception preventing the untrusted entity from accessing the page; and
responsive to the exception, issuing, by the untrusted entity, an import call routine; and
executing, by a secure interface control of the computing system, the import call routine.

21. The computer-implemented method of claim 20, wherein the import call routine comprises:
determining, by a secure interface control of the computing system, whether the page is a shared page.

22. The computer-implemented method of claim 21, wherein the import call routine further comprises:
responsive to determining that the secure page is not a shared secure page, marking, by the secure interface control, the secure page as secure.

23. The computer-implemented method of claim 21, wherein the import call routine further comprises:

registering, by the secure interface control, the secure page to the secure interface control in a zone-security table.

24. The computer-implemented method of claim 21, wherein the import call routine further comprises:
decrypting, by the secure interface control, the secure page.

25. A computer program product comprising:
a computer readable storage medium having program instructions embodied therewith, the program instructions executable by a processing device to cause the processing device to perform a method comprising:
responsive to a secure entity accessing a page that has been paged-in by a untrusted entity of a computing system but is not yet secure, presenting, by a hardware control of the computing system, an exception to the untrusted entity of the computing system, the exception preventing the untrusted entity from accessing the page; and
responsive to the exception, issuing, by the untrusted entity, an import call routine; and
executing, by a secure interface control of the computing system, the import call routine.

* * * * *